(12) United States Patent
Wang et al.

(10) Patent No.: US 12,308,717 B2
(45) Date of Patent: May 20, 2025

(54) ENERGY-SAVING THREE-PHASE BRUSHLESS DIRECT-CURRENT MACHINE

(71) Applicant: DONG GUAN CITY MAO SHENG ELECTRONIC INDUSTRIES LTD., Dong Guan (CN)

(72) Inventors: Kun-Sheng Wang, Dong Guan (CN); Yu Yang, DongGuan (CN)

(73) Assignee: DONG GUAN CITY MAO SHENG ELECTRONIC INDUSTRIES LTD., Dong Guan (CN)

( * ) Notice: Subject to any disclaimer, the term of this patent is extended or adjusted under 35 U.S.C. 154(b) by 264 days.

(21) Appl. No.: 18/143,668

(22) Filed: May 5, 2023

(65) Prior Publication Data
US 2024/0283313 A1    Aug. 22, 2024

(30) Foreign Application Priority Data
Feb. 22, 2023   (TW) .................................. 112106421

(51) Int. Cl.
*H02K 3/12*        (2006.01)
*H02K 1/16*        (2006.01)
(Continued)

(52) U.S. Cl.
CPC ................. *H02K 3/12* (2013.01); *H02K 1/16* (2013.01); *H02K 5/04* (2013.01); *H02K 7/003* (2013.01); *H02K 7/116* (2013.01)

(58) Field of Classification Search
CPC .. H02K 3/12; H02K 3/14; H02K 3/28; H02K 3/48; H02K 7/003; H02K 7/116
See application file for complete search history.

(56) References Cited

U.S. PATENT DOCUMENTS 5,581,136 A * 12/1996 Li ........................ H02K 29/08
                                                            310/67 R
5,723,930 A *  3/1998 Ho .......................... H02K 3/28
                                                              310/179
(Continued)

FOREIGN PATENT DOCUMENTS

CN    107681799 B  *  7/2019  ............... H02K 1/28
JP    2012152005 A  *  8/2012  ............... H02K 3/04

OTHER PUBLICATIONS

CN107681799B Translation (Year: 2019).*
JP2012152005A Translation (Year: 2012).*

*Primary Examiner* — Oluseye Iwarere
*Assistant Examiner* — Nicholas Lee Setzer
(74) *Attorney, Agent, or Firm* — Demian K. Jackson; Jackson IPG PLLC (57) ABSTRACT

A brushless direct-current machine is provided, comprising a casing; a body in the casing; a motor in the body; a stator coil bidirectionally wound through slots but not empty slots; and a set of planetary gears. The duty ratio of pulse-width modulation is adjusted by using the three-phase windings of the stator coil to change a current flowing through. A controller switches the current direction of the windings for producing changes in magnetic field. Between the polarity of the stator and the polarities of magnets of a rotor, power is generated owing to the simultaneous functions of same-pole repulsion and opposite-pole attraction for controlling the rotation of the rotor. The 3 empty slots are used to break the original magnetic field into parts to make the rotation force lighter and driving effect better. Thus, an activating current is lowered, and energy and electricity are saved effectively.

5 Claims, 8 Drawing Sheets

(51) Int. Cl.
    *H02K 5/04*     (2006.01)
    *H02K 7/00*     (2006.01)
    *H02K 7/116*     (2006.01)

(56) References Cited

U.S. PATENT DOCUMENTS

2008/0129243 A1*   6/2008   Nashiki .................... H02K 3/28
                                                                         318/701
2008/0308336 A1*  12/2008   van Rooij ................ B62M 6/65
                                                                         180/206.6

* cited by examiner

ENERGY-SAVING THREE-PHASE BRUSHLESS DIRECT-CURRENT MACHINE

TECHNICAL FIELD OF THE INVENTION

The present invention relates to a brushless direct-current (DC) machine; more particularly, to using three empty slots to break magnetic field into parts to make rotation force lighter and driving effect better, where a power-saving function is achieved; an activating current is lowered; and energy and electricity are saved effectively.

DESCRIPTION OF THE RELATED ARTS

A type of common electromechanical machinery is a brushless DC motor, which usually comprises a stator and a rotor. The stator usually consists of a coil having a set of three windings. The rotor usually contains permanent magnets. The rotor and the stator are mechanically aligned to allow the rotor to move freely as relating to the fixed stator. Hence, the electromagnetic interactions between the stator and the rotor cause the rotor to move in response to the polarity changes of the windings of the stator.

The windings of a general three-phase brushless DC motor is divided into main-pole windings and slot windings, whose effects on current and magnetic field are different. The current of the main-pole winding produces a large phase difference, but the current of the slot winding has a smaller phase difference. The magnetic fields thus generated by the above two windings are also different. Besides, due to jagged silicon steel sheets in the slot winding, the inductance is reduced to make the overall inductance lower, yet the inductance of the main pole winding is larger than that of the slot winding. Hence, the prior art does not fulfill all users' requests on actual use.

SUMMARY OF THE INVENTION

The main purpose of the present invention is to adjust the duty ratio of pulse-width modulation (PWM) by using three-phase windings of a coil to change current; to switch the direction of the current flowing through the three-phase windings by a controller for producing changes in magnetic field; between the polarity of a stator and the polarities of magnets of a rotor, to generate power owing to the simultaneous functions of same-pole repulsion and opposite-pole attraction in the magnetic field for controlling the rotation; to break the magnetic field into parts by three empty slots for making rotation force lighter and driving effect better on rotating the rotor; and, thus, to achieve a power-saving function, lower an activating current, and effectively save energy and electricity.

To achieve the above purpose, the present invention is an energy-saving three-phase brushless DC machine, comprising a hub casing, a machinery body, a machinery motor, a stator coil, and a set of planetary gears, where the hub casing is a hollow shell, comprising a hub, and an upper hub cover and a lower hub cover screwed at the left side and the right side of the hub, respectively; at the centers of the upper hub cover and the lower hub cover, a first shaft sleeve is penetratingly provided separately; the machinery body is put in the hub casing and is a hollow shell, comprising a central machinery tube, and an upper machinery cover and a lower machinery cover at the left end and the right end of the central machinery tube, respectively; at the center of the upper machinery cover, a second shaft sleeve is penetratingly provided; a plurality of planetary sleeves are penetratingly provided around the second shaft sleeve; the machinery motor is put in the machinery body and comprises a stator and a rotor; the stator is fitted in the central machinery tube and has a stator core; the stator core comprises a plurality of slots formed along the periphery of a central through-hole, and a plurality of main poles each of which bounded by two of the slots; three empty slots, not penetrated by wire, are contained in the slots and positioned at an angle of 120 degrees to each other; each of the slots comprises a first starting area, a second starting area, and a third starting area; the first starting area has a first depth, the second starting area has a second depth, and the third starting area has a third depth; a distance from the first starting area of each slot to an opening end of the slot is greater than a distance from the second starting area of the slot to the opening end, and a distance from the third starting area of the slot to the opening end is small than a distance from the second starting area to the opening end; the rotor is penetratingly deposited in the stator to rotate and has a rotor core, comprising a plurality of silicon steel sheets stacked together; each of the silicon steel sheets is provided with a shaft hole at center to be inserted with a central shaft to be integrated with the rotor core; the end of the central shaft is coaxially set with a ring of motor teeth to move concertedly; a plurality of magnets radially magnetized are set around and spaced on the periphery of the rotor core; the stator coil is bidirectionally wound through each of the slots except the empty slots; the stator coil comprises a first-phase main winding, a second-phase main winding, and a third-phase main winding; an end of the first-phase main winding, an end of the second-phase main winding, and an end of the third-phase main winding are connected in parallel to a common point with the other end of the first-phase main winding, the other end of the second-phase main winding, and the other end of the third-phase main winding connected to a control point of a controller to switch between three-phase windings by the controller; the first-phase main winding is spanned over two of the slots or two of the slots together with one of the empty slots to be wound around the first starting area; the second-phase main winding is spanned over two of the slots or two of the slots together with one of the empty slots to be wound around the second starting area; the third-phase main winding is spanned over two of the slots or two of the slots together with one of the empty slots to be wound around the third starting area; the first-phase main winding, the second-phase main winding, and the third-phase main winding are wound in a forward-winding direction and continuously wound in a reverse-winding direction by turning back after reaching a terminal point; the stator coil of the first-phase main winding, the stator coil of the second-phase main winding, and the stator coil of the third-phase main winding are alternately set on a front surface and a back surface of the stator core; the set of the planetary gears is located between the upper hub cover and the upper machinery cover and comprises an upper support, a gear ring, and a plurality of planetary teeth; the upper support is penetratingly provided with a third shaft sleeve; the gear ring is provided with a ring of inner teeth at inner circle of the gear ring and a ring of clutch teeth at outer circle of the gear ring to be fitted in the upper hub cover; and each of the planetary gears is rotatably set on the upper support through a bearing and a shaft center as facing the upper machinery cover of the machinery motor to surround the periphery of the ring of the motor teeth, and meshes with the ring of the motor teeth, and the ring of the inner teeth of the gear ring, separately. Accordingly, a novel energy-saving three-phase brushless DC machine is obtained.

BRIEF DESCRIPTION OF THE DRAWINGS

The present invention will be better understood from the following detailed description of the preferred embodiment according to the present invention, taken in conjunction with the accompanying drawings, in which.

DESCRIPTION OF THE PREFERRED EMBODIMENT

The following description of the preferred embodiment is provided to understand the features and the structures of the present invention.

Please refer to FIG. 1 to FIG. 8, which are an exploded view showing a preferred embodiment according to the present invention; an assembled view showing the preferred embodiment; a sectional view showing a stator; a view showing windings of a stator coil; a view showing the windings at the front surface of the stator; a view showing the windings at the back surface of the stator; a sectional view showing a machinery motor; and a sectional view showing a set of planetary gears. As shown in the figures, the present invention is an energy-saving three-phase brushless direct-current (DC) machine, comprising a hub casing 1, a machinery body 2, a machinery motor 3, a stator coil 4, and a set of planetary gears 5.

Figure 1:
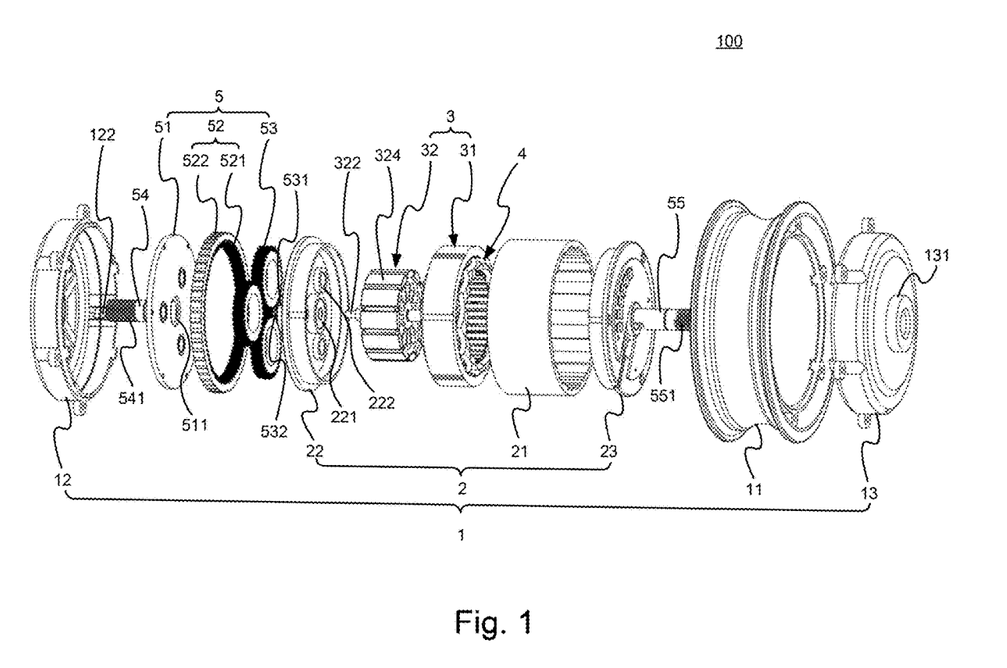
FIG. 1 is the exploded view showing the preferred embodiment according to the present invention.

The hub casing 1 is a hollow shell, comprising a hub 11; and an upper hub cover 12 and a lower hub cover 13 screwed at the left side and the right side of the hub 11, respectively. At the centers of the upper hub cover 12 and the lower hub cover 13, a first shaft sleeve 121, 131 is penetratingly set, separately.

The machinery body 2 is contained in the hub casing 1 and is a hollow shell, comprising a central machinery tube 21; and an upper machinery cover 22 and a lower machinery cover 23 at the left end and the right end of the central machinery tube 21, respectively. At the center of the upper cover 22, a second shaft sleeve 221 is penetratingly set. A plurality of planetary sleeves 222 are penetratingly set around the second shaft sleeve 221.

Figure 3:
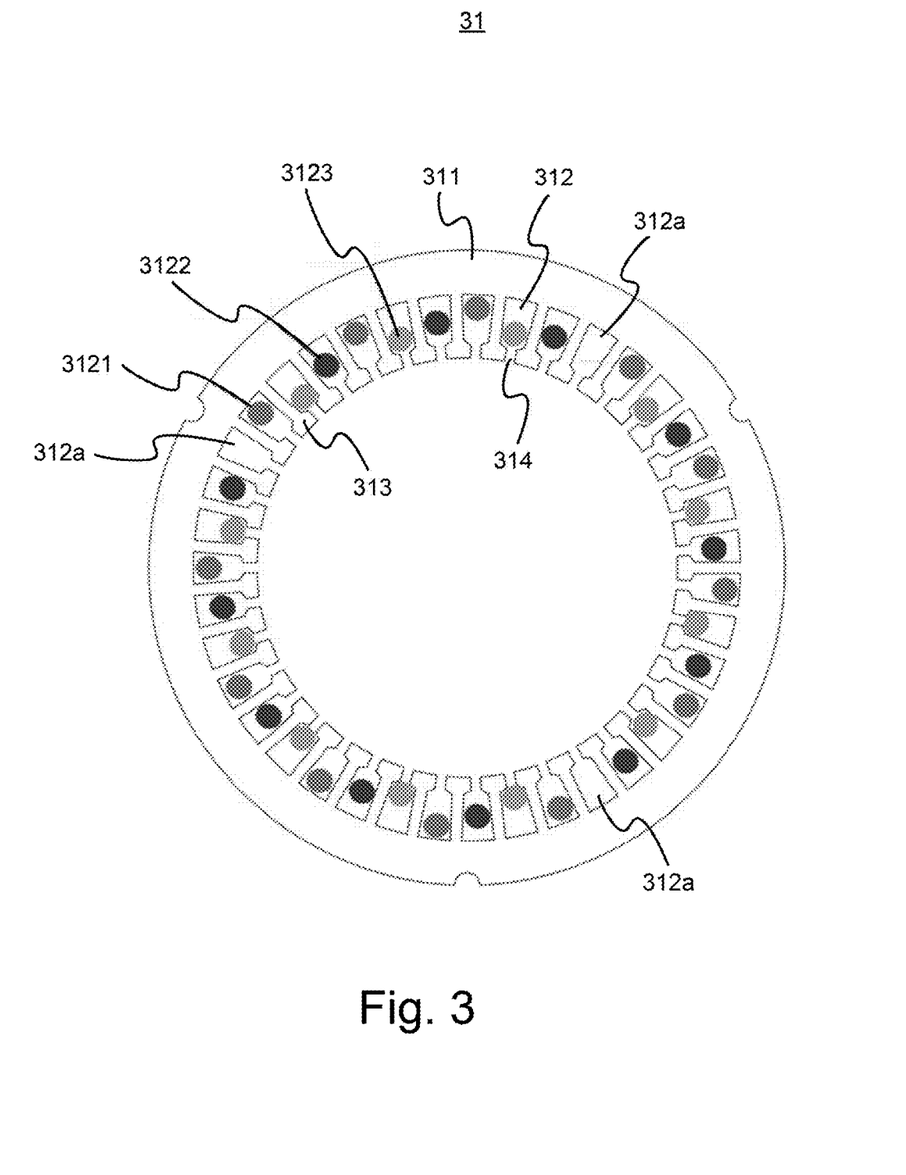
FIG. 3 is the sectional view showing the stator.
Figure 7:
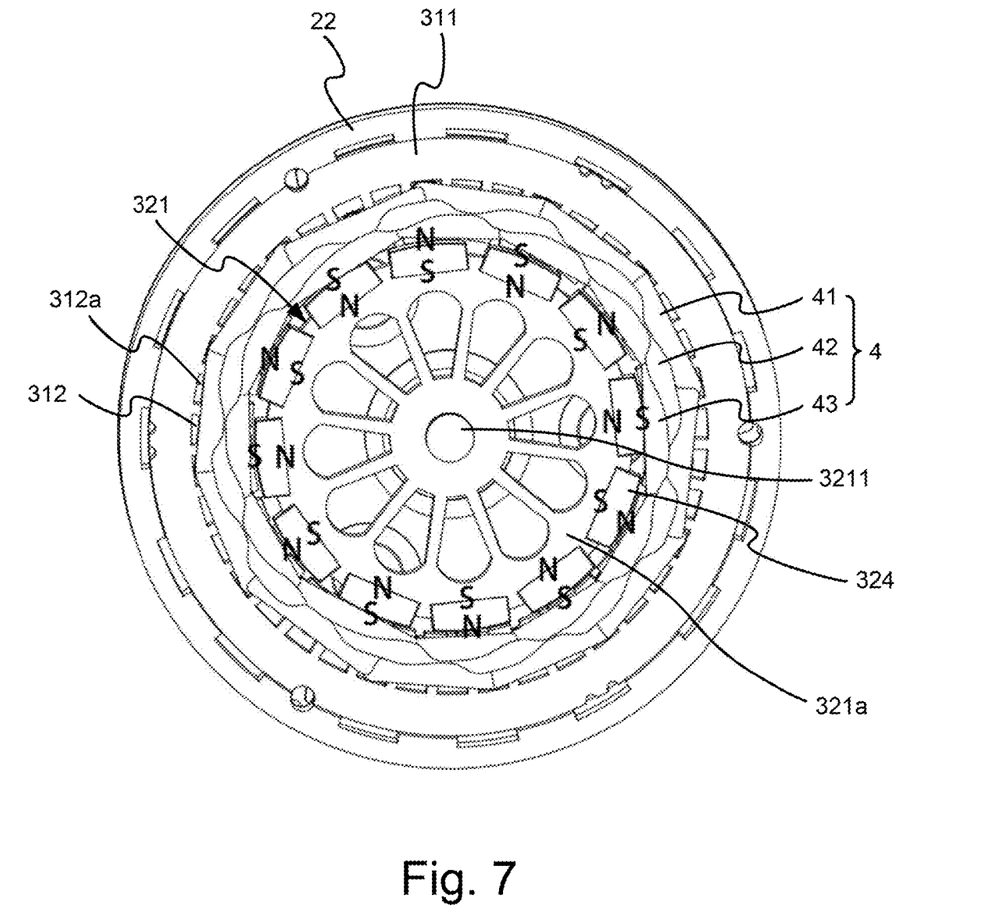
FIG. 7 is the sectional view showing the machinery motor.

The machinery motor 3 is put in the machinery body 2 and comprises the stator 31 and a rotor 32. The stator 31 is fitted in the central machinery tube 21 and has a stator core 311. The stator core 311 comprises a plurality of slots 312 formed along the periphery of a central through-hole; and a plurality of main poles 313 each of which bounded by two of the slots 312. Three empty slots 312a, not penetrated by wire, are contained in the slots 312 and positioned at an angle of 120 degrees (°) to each other. Each of the slots 312 comprises a first starting area 3121, a second starting area 3122, and a third starting area 3123. The first starting area 3121 has a first depth, the second starting area 3122 has a second depth, and the third starting area 3123 has a first depth. A distance from the first starting area 3121 of each slot 312 to an opening end 314 of the slot 312 is greater than a distance from the second starting area 3122 of the slot 312 to the opening end 314; and a distance from the third starting area 3123 of the slot 312 to the opening end 314 is smaller than a distance from the second starting area 3122 to the opening end 314. The rotor 32 is penetratingly set in the stator 31 to rotate and has a rotor core 321, comprising a plurality of silicon steel sheets 321a stacked together. Each of the silicon steel sheets 321a is set with a shaft hole 3211 at center to be inserted with a central shaft 322 for being integrated with the rotor core 321; the end of the central shaft 322 is coaxially set with a ring 223 of motor teeth for moving concertedly; and a plurality of magnets 324 radially magnetized are set around and spaced on the periphery of the rotor core 321.

Figure 4:
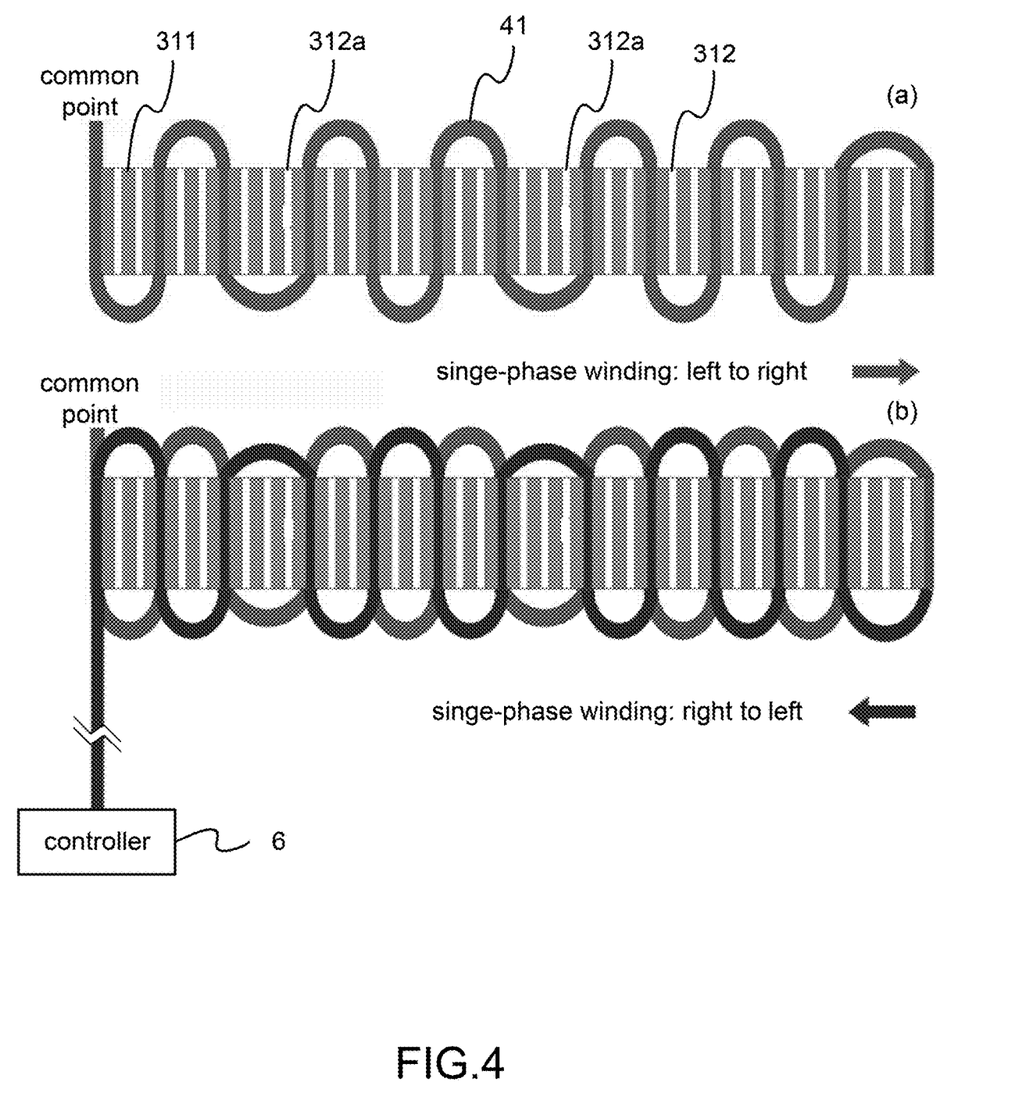
FIG. 4 is the view showing the windings of the stator coil.
Figure 5:
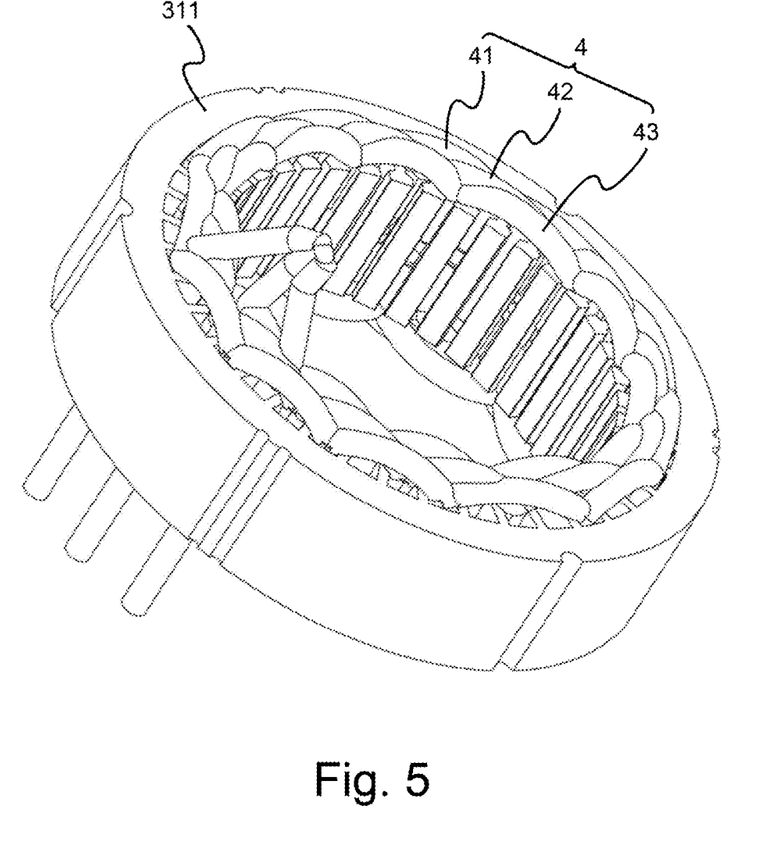
FIG. 5 is the view showing the windings at the front surface of the stator.
Figure 6:
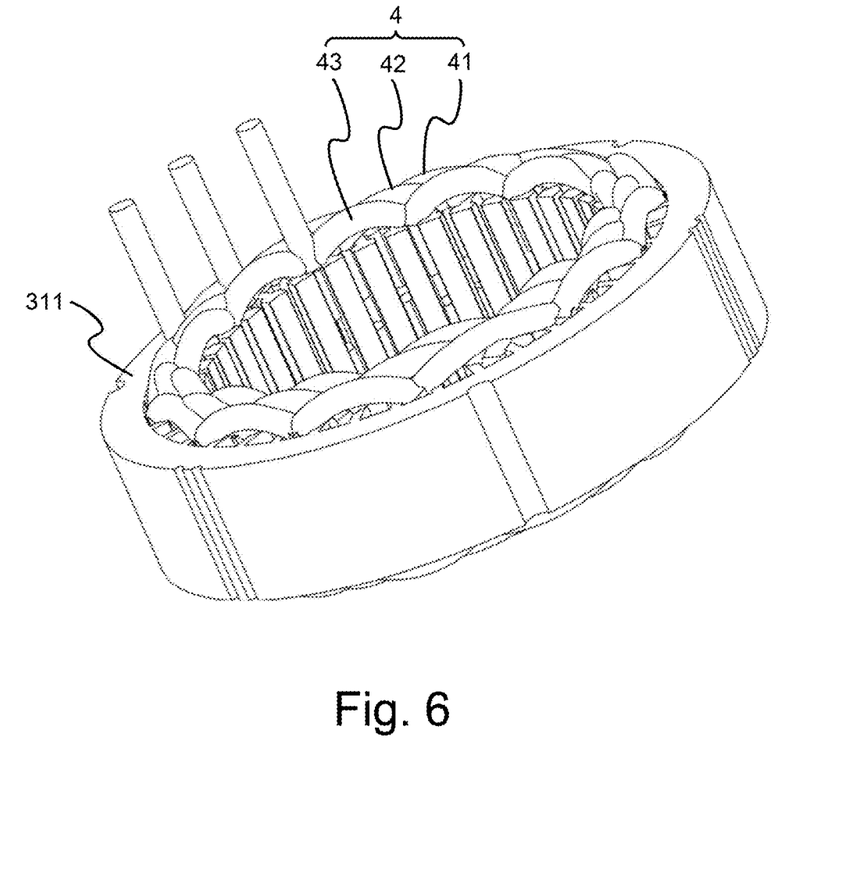
FIG. 6 is the view showing the windings at the back surface of the stator.

The stator coil 4 is bidirectionally wound through each of the slots 312 except the empty slots 312a. The stator coil 4 comprises a first-phase main winding 41, a second-phase main winding 42, and a third-phase main winding 43. An end of the first-phase main winding 41, an end of the second-phase main winding 42, and an end of the third-phase main winding 43 are connected in parallel to a common point with the other ends connected to a control point of a controller 6 for switching between three-phase windings by the controller 6. The first-phase main winding 41 is spanned over two of the slots 312 or two of the slots 312 together with one of the empty slots 312a to be wound around the first starting area 3121. The second-phase main winding 42 is spanned over two of the slots 312 or two of the slots 312 together with one of the empty slots 312a to be wound around the second starting area 3122. The third-phase main winding 43 is spanned over two of the slots 312 or two of the slots 312 together with one of the empty slots 312a to be wound around the third starting area 3123. The first-phase main winding 41, the second-phase main winding 42, and the third-phase main winding 43 are wound in a forward-winding direction and continuously wound in a reverse-winding direction by turning back after reaching a terminal point. The stator coil 4 of the first-phase main winding 41, that of the second-phase main winding 42, and that of the third-phase main winding 43 are alternately set on a front surface and a back surface of the stator core 311.

Figure 8:
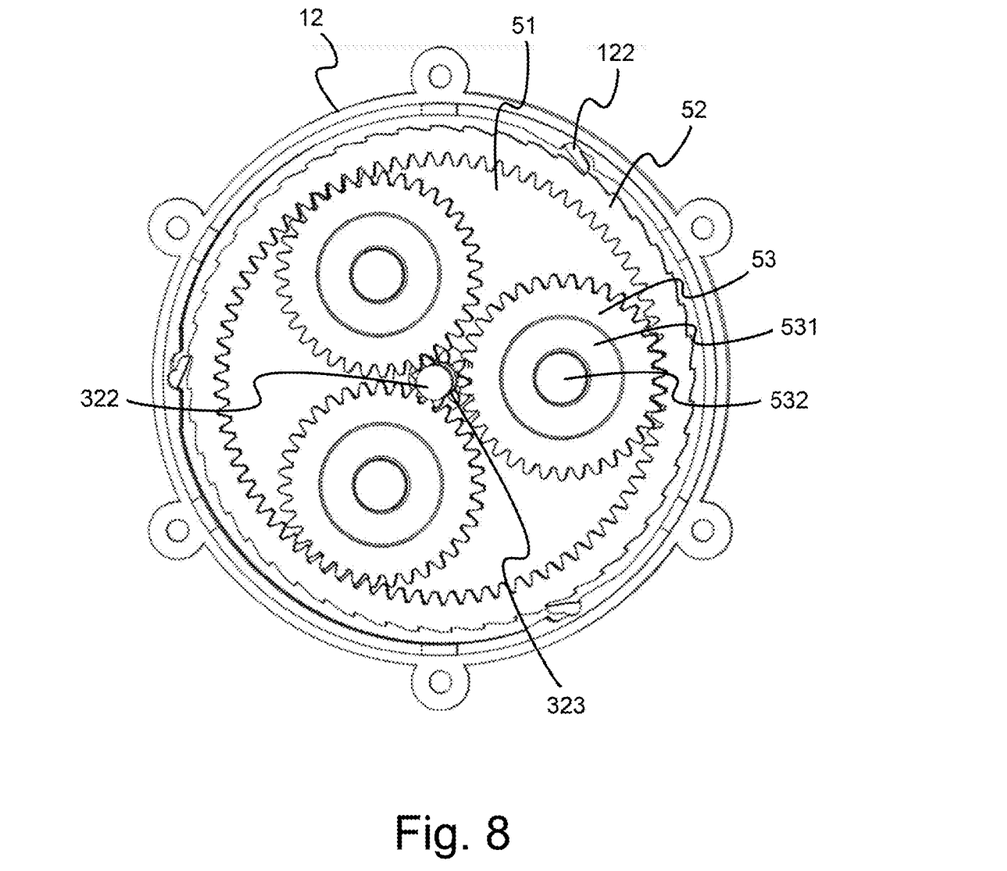
FIG. 8 is the sectional view showing the set of the planetary gears.

The set of the planetary gears 5 is located between the upper hub cover 12 and the upper machinery cover 22 and comprises an upper support 51, a gear ring 52, and a plurality of planetary teeth 53. The upper support 51 is penetratingly set with a third shaft sleeve 511. The gear ring 52 is set with a ring of inner teeth 521 at inner circle of the gear ring 52 and a ring of clutch teeth 522 at outer circle of the gear ring 52 to be fitted in the upper hub cover 12. Each of the planetary gears 53 is rotatably set on the upper support 51 through a bearing 531 and a shaft center 532 as facing the upper machinery cover 22 of the machinery motor 3 to surround the periphery of the ring of the motor teeth 323, and meshes with the ring of the motor teeth 323, and the ring of the inner teeth 521 of the gear ring 52, separately. Thus, a novel brushless DC machine 100 is obtained.

In a state-of-use, the stator core 311 is formed with a total of 39 of the slots 312 and 39 of the main poles 313 to be wound around the stator core 311 to flow three-phase current, as shown in FIG. 3.

In a state-of-use, the upper hub cover 12 is further set with a plurality of pawls 122 at around inner circle to be positioned at an angle of 120° to each other to cooperate with the ring of the clutch teeth 522 of the gear ring 52 for being matched to achieve one-way transmission, as shown in FIG. 8.

In a state-of-use, the upper support 51 is set with an upper shaft part 54 at an end of the upper support 51 as facing the upper hub cover 12, penetrated into the first shaft sleeve 121 of the upper hub cover 12, and penetrated out to the outside of the hub casing 1. The lower machinery cover 23 is set with a lower shaft part 55 at a side of the lower machinery cover 23 as facing the lower hub cover 13, penetrated into the first shaft sleeve 131 of the lower hub cover 13, and penetrated out to the outside of the hub casing 1. Thus, the left end and the right end of the central shaft 322 are penetratingly set in the upper shaft part 54 and the lower shaft part 55, respectively.

Figure 2:
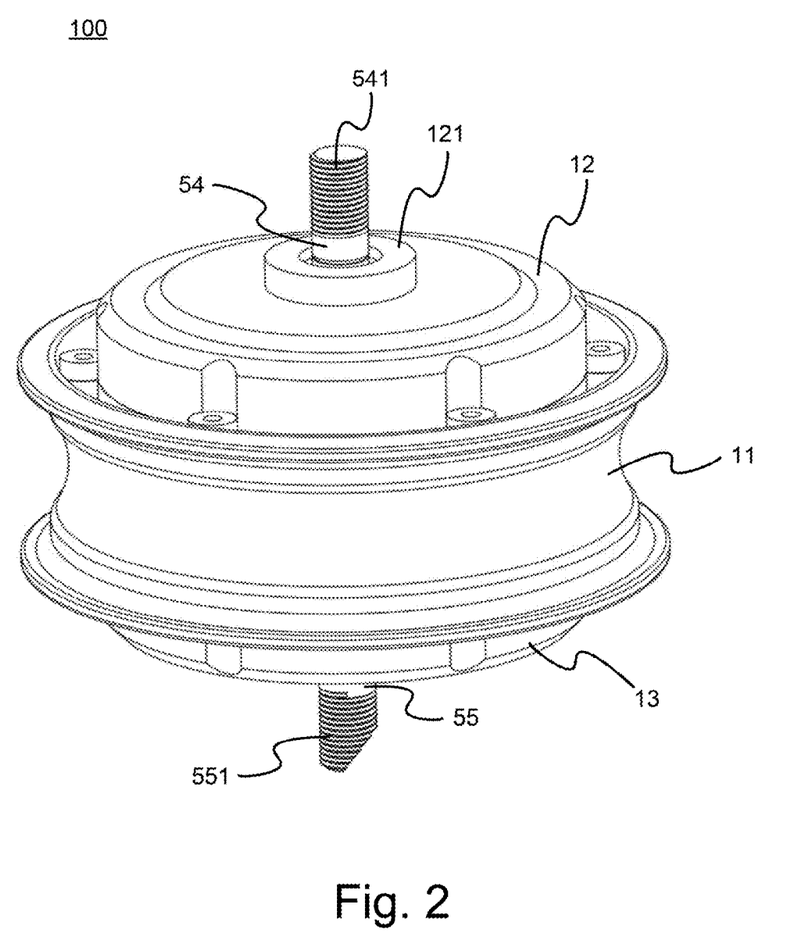
FIG. 2 is the assembled view showing the preferred embodiment.

In a state-of-use, a threaded part 541,551 is separately formed at an end of the upper shaft part 54 and an end of the lower shaft part 55, as shown in FIG. 2, to connect an electric tool (not shown in the figure).

On assembling, the present invention provides an improvement in stator winding, where the overall structure includes a rotor 32 and a stator 31 to form a machinery motor 3. The rotor 32 is set with twelve radially magnetized magnets 324 set around and spaced on the periphery, where the poles of the magnets 324 are continuous to be close to the main poles 313 of the stator 31 and the distribution is shown in FIG. 7. As shown in the cross-section view of the magnets 324, each of the magnet 324 has a half of an S pole and the other half of an N pole; twelve of the magnets 324 form poles of S, N, S, N . . . to arrange and set the poles of the same outer ring at intervals of S, N, S, N . . . ; then, the controller 6 switches the flowing of the current in the stator coil 4; and, thus, the pole of the stator 31 is made into an active pole.

Then, the central machinery tube 21 is sleeved on the outside of the machinery motor 3. The machinery body 2 is formed by combining the upper machinery cover 22 and the lower machinery cover 23 on the left side and the right side of the central machinery tube 21, respectively. A plurality of the planetary gears 53 between the upper machinery cover 22 and the upper hub cover 12 is installed along with the upper support 51 to match the inner and outer circles of the gear ring 52 comprising the ring of the inner teeth 521 and the ring of the clutch teeth 525. As follows, the upper hub cover 1 and the lower hub cover 13 are assembled to complete the entire assembly of the brushless DC machine 100 thus formed.

Concerning the winding of the stator coil 4, the stator 31 is formed with the three-phase windings of the stator coil 4 as comprising a total of 39 of the slots 312 and 39 of the main poles 313. Among the 39 slots 312, the 3 empty slots 312a are not penetrated by wire and are positioned at an angle of 120 degrees to each other. In comparison, the traditional technology has all slots wound, a closed magnetic field formed, and the negative attraction of the magnetic field generated. Therewith, on powering on to rotate, bigger current is required for driving as leading to poor power-saving. Nevertheless, the brushless DC machine 100 provided by the present invention uses the empty slots 312a to break the closed magnetic field for reducing negative suction. As shown in FIG. 4, for making the view simple and clear, a single-phase winding (e.g.: first-phase main winding 41) is taken as an example. Diagram (a) in FIG. 4 shows the first-phase main winding 41 with the winding direction from left to right. After entering through the first one of the slots 312, the winding is spanned over two of the slots 312 and, then, penetrated out through the third one of the slots 312. If the third one of the slots 312 is one of the empty slots 312a, the winding is penetrated out through the fourth one of the slots 312 to be wound around the first starting area 3121. In this way, the winding is wound in a direction from left to right before reaching a terminal point for turning back. Then, the winding is changed into a direction from right to left as shown in Diagram (b) in FIG. 4. The above winding continues, where the first-phase main winding 41 is arranged alternately on the front side and the back side of the stator core 311; and the front and back sides of the three-phase main windings 41~43 are shown in FIG. 5 and FIG. 6 after completing all windings.

On running, the present invention uses the three-phase windings of the stator coil 4 to adjust the duty ratio of pulse-width modulation (PWM) to lower impedance and inductance for effectively reducing copper loss to change the current flowing through. The controller 6 switches the direction of the current flowing through the three-phase windings of the stator coil 4 for producing changes in magnetic field. Thus, between the polarity of the stator 31 and the polarities of the magnets 324 of the rotor 32, power is generated owing to the simultaneous functions of same-pole repulsion and opposite-pole attraction in the magnetic field for controlling the rotation of the rotor 32. The present invention further uses the three empty slots 312a to break the original magnetic field into parts (i.e. $\frac{1}{13}$, which, in fact, equals to correspond 36 main poles of the stator to 12 magnets of the rotor.) for making the rotation force lighter and the driving effect better on rotating the rotor 32. Hence, a power-saving function is achieved; an activating current is lowered; and energy and electricity are saved effectively.

To sum up, the present invention is an energy-saving three-phase brushless DC machine, where three-phase windings of a stator coil is used to reduce impedance and inductance for effectively reducing copper loss; a controller is obtained to switch the direction of current flowing through the three-phase windings for producing changes in magnetic field; between the polarity of the stator and the polarities of magnets of a rotor, power is generated owing to the simultaneous functions of same-pole repulsion and opposite-pole attraction in the magnetic field for controlling the rotation of the rotor; 3 empty slots are used to break the original magnetic field into parts for making the rotation force lighter and the driving effect better on rotating the rotor; and, thus, a power-saving function is achieved, an activating current is lowered, and energy and electricity are saved effectively.

The preferred embodiment herein disclosed is not intended to unnecessarily limit the scope of the invention. Therefore, simple modifications or variations belonging to the equivalent of the scope of the claims and the instructions disclosed herein for a patent are all within the scope of the present invention.

What is claimed is:

1. An energy-saving three-phase brushless direct-current machine, comprising
   a hub casing,
      wherein said hub casing is a hollow shell, comprising a hub; and an upper hub cover and a lower hub cover screwed at the left side and the right side of said hub, respectively; and, at the centers of said upper hub cover and said lower hub cover, a first shaft sleeve is penetratingly provided separately;
   a machinery body,
      wherein said machinery body is deposited in said hub casing and is a hollow shell, comprising a central machinery tube; and an upper machinery cover and a lower machinery cover at the left end and the right end of said central machinery tube, respectively; at the center of said upper machinery cover, a second shaft sleeve is penetratingly provided; and a plurality of planetary sleeves are penetratingly provided around said second shaft sleeve;

a machinery motor,
wherein said machinery motor is deposited in said machinery body and comprises a stator and a rotor; said stator is fitted in said central machinery tube and has a stator core; said stator core comprises a plurality of slots obtained along the periphery of a central through-hole, and a plurality of main poles each of which bounded by two of said slots; three empty slots, not penetrated by wire, are contained in said slots and positioned at an angle of 120 degrees to each other; each of said slots comprises a first starting area, a second starting area, and a third starting area; said first starting area has a first depth, said second starting area has a second depth, and said third starting area has a third depth; a distance from said first starting area of each one of said slots to an opening end of said one of said slots is greater than a distance from said second starting area of said one of said slots to said opening end of said one of said slots, and a distance from said third starting area of said one of said slots to said opening end of said one of said slots is small than a distance from said second starting area of said one of said slots to said opening end of said one of said slots; said rotor is penetratingly deposited in said stator to rotate and has a rotor core, comprising a plurality of silicon steel sheets stacked together; each of said silicon steel sheets is provided with a shaft hole at center to be deposited with a central shaft to be integrated with said rotor core; the end of said central shaft is coaxially obtained with a ring of motor teeth to move concertedly; and a plurality of magnets radially magnetized are obtained around and spaced on the periphery of said rotor core;

a stator coil,
wherein said stator coil is bidirectionally wound through each of said slots except said empty slots; said stator coil comprises a first-phase main winding, a second-phase main winding, and a third-phase main winding; an end of said first-phase main winding, an end of said second-phase main winding, and an end of said third-phase main winding are connected in parallel to a common point with the other end of said first-phase main winding, the other end of said second-phase main winding, and the other end of said third-phase main winding connected to a control point of a controller to switch between three-phase windings by said controller; said first-phase main winding is spanned over a number of said slots, selected from a group consisting of two of said slots and two of said slots together with one of said empty slots, to be wound around said first starting area; said second-phase main winding is spanned over a number of said slots, selected from a group consisting of two of said slots and two of said slots together with one of said empty slots, to be wound around said second starting area; said third-phase main winding is spanned over a number of said slots, selected from a group consisting of two of said slots and two of said slots together with one of said empty slots, to be wound around said third starting area; said first-phase main winding, said second-phase main winding, and said third-phase main winding are wound in a forward-winding direction and continuously wound in a reverse-winding direction by turning back after reaching a terminal point; said stator coil of said first-phase main winding, said stator coil of said second-phase main winding, and said stator coil of said third-phase main winding are alternately obtained on a front surface and a back surface of said stator core; and a set of planetary gears,
wherein said set of said planetary gears is located between said upper hub cover and said upper machinery cover and comprises an upper support, a gear ring, and a plurality of planetary teeth; said upper support is penetratingly provided with a third shaft sleeve; said gear ring is provided with a ring of inner teeth at inner circle of said gear ring and a ring of clutch teeth at outer circle of said gear ring to be fitted in said upper hub cover; and each of said planetary gears is rotatably obtained on said upper support through a bearing and a shaft center as facing said upper machinery cover of said machinery motor to surround the periphery of said ring of said motor teeth, and meshes with said ring of said motor teeth, and said ring of said inner teeth of said gear ring, separately.

2. The machine according to claim 1,
wherein said stator core is obtained with a total of 39 of said slots and 39 of said main poles to be wound around said stator coil to flow three-phase current.

3. The machine according to claim 1,
wherein said upper hub cover is further provided with a plurality of pawls at around inner circle to be positioned at an angle of 120 degrees to each other to cooperate with said ring of said clutch teeth of said gear ring as being matched to obtain one-way transmission.

4. The machine according to claim 1,
wherein said upper support is provided with an upper shaft part at an end of said upper support as facing said upper hub cover; said upper shaft part is penetrated into said first shaft sleeve of said upper hub cover and penetrated out to the outside of said hub casing; said lower machinery cover is provided with a lower shaft part at a side of said lower machinery cover as facing said lower hub cover; said lower shaft part is penetrated into said first shaft sleeve of said lower hub cover and penetrated out to the outside of said hub casing; and, thus, the left end and the right end of said central shaft are penetratingly obtained in said upper shaft part and said lower shaft part, respectively.

5. The machine according to claim 4,
wherein a threaded part is separately provided at an end of said upper shaft part and an end of said lower shaft part to connect an electric tool.

* * * * *